Jan. 29, 1963 J. V. OTT 3,075,219
PIPE CLEANING TOOL
Filed April 11, 1960

INVENTOR.
Jason V. Ott
BY
Hovey, Schmidt, Johnson & Hovey
ATTORNEYS.

United States Patent Office 3,075,219
Patented Jan. 29, 1963

3,075,219
PIPE CLEANING TOOL
Jason V. Ott, 7507 Aberdeen, Prairie Village, Kans.
Filed Apr. 11, 1960, Ser. No. 21,464
1 Claim. (Cl. 15—104.04)

This invention relates to pipe cleaning tools and more particularly to such a tool in the nature of a scraper for use in cleaning the exterior surface of plastic piping.

It is the most important object of this invention to provide a tool for removing extraneous matter, such as dirt, grease or moisture, from the outer surface of one end of a pipe to facilitate the connection of the pipe to a similar pipe or to an article of non-analogous material, which connection requires that the surfaces to be joined be cleaned in order to produce a tight joint.

It is a further object of this invention to provide a cleaning tool which is adapted to be interconnected with an open end of a length of plastic pipe whereby the outer surface of the pipe may be cleaned by rotating the tool with respect to the pipe and scaping said surface to remove therefrom all foreign matter as well as a thin layer of the plastic if such be desired.

Another object of the present invention is to provide a pipe cleaning tool having an adjustable blade whereby the same may be adapted to engage and scrape the outer surface of pipes of various sizes, so that the present tool may be used in connection with pipes of varying diameters.

A yet further aim of this invention is to provide a pipe cleaning tool having a rotatable blade element adapted to scrape the outer surface of a plastic pipe adjacent an end thereof, which blade element may be easily rotated by a single operator through a handle coupled therewith.

Other objects include details of construction which will become apparent from the following specification and accompanying drawing, wherein.

Figure 1:
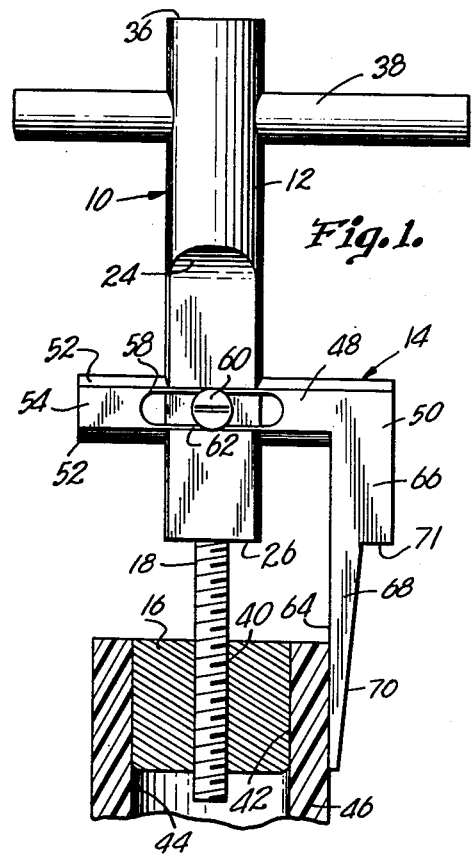
FIGURE 1 is a front elevational view partially in section of the pipe cleaning tool, illustrating the relation between the tool and a pipe to be scraped.

The pipe cleaning tool is broadly designated by the numeral 10 and basically comprises a shaft 12, a blade element 14, a plug 16 and a connecting rod 18 joining shaft 12 and plug 16.

Figure 3:
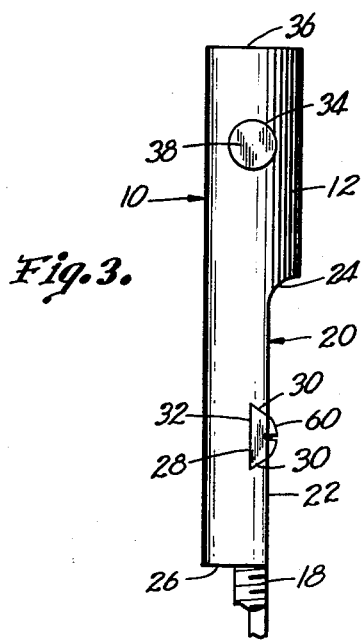
FIG. 3 is a fragmentary side elevational view thereof.
Figure 4:
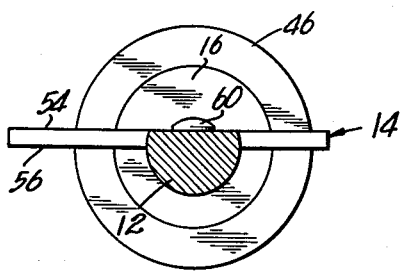
FIG. 4 is a sectional view taken on line 4—4 of FIG. 2.

Shaft 12, which is illustrated as essentially cylindrical, is provided, adjacent one end thereof, with an offset portion 20 having a flat face 22 which merges with the remainder of shaft 12 at an arcuate portion 24 as best seen in FIG. 3. Formed in shaft 12 at substantially the center of face 22 of portion 20 and proximal to one end 26 of shaft 12 is a transverse groove 28 having a pair of opposed beveled side edges 30 and a flat bottom 32 which is preferably coincident with the longitudinal axis of shaft 12. Shaft 12 is also provided with an opening 34 formed therein transversely to the longitudinal axis of shaft 12 and proximal to an end 36 of said shaft 12. Opening 34 is adapted to receive an elongated member 38, which member 38 is preferably cylindrical and adapted to be used as a handle for manually rotating shaft 12 about its longitudinal axis. Member 38 extends outwardly from shaft 12 on either side of the latter so that member 38 may be grasped by one hand to accomplish the rotation of shaft 12.

Connecting rod 18, which may be formed as an integral part of shaft 12 or otherwise suitably secured thereto, extends outwardly from end 26 of shaft 12, is concentric therewith and is provided with threads throughout its length for a purpose hereinafter to be described.

Plug 16, which is cylindrical to conform to the inside diameter of pipes to be scraped, is preferably made from a frictionable material and is provided with a passage 40 extending therethrough at substantially the center thereof. The outer surface 42 of plug 16 is adapted to tightly engage the inner surface 44 of a pipe 46. As best seen in FIG. 1, plug 16 is inserted a short distance into the end of pipe 46 so as to engage an area of the inner surface 44 adequate to frictionally hold plug 16 therewithin.

Blade element 14 is substantially L-shaped and has a first leg 48 and a second leg 50. Leg 48 is provided with a pair of outermost beveled edges 52 conforming to the beveled side edges 30 of groove 28 in shaft 12. Said leg 48 is also provided with a front face 54 and a rear face 56 and is adapted to be inserted within groove 28 so that rear face 56 engages the bottom 32 of groove 28 and edges 52 of leg 48 engage edges 30 of groove 28. As a result of being so seated within groove 28, leg 48 may slide within groove 28.

Leg 48 of blade element 14 is also provided with a slot 58 extending longitudinally thereof and transversely therethrough, which slot 58 receives a screw 60 carried by shaft 12 in face 22 thereof. Screw 60 may be turned with respect to face 22 of shaft 12 so that the underside of screw 60 may alternately become engaged and disengaged with segments 62 of leg 48 adjacent slot 58. As screw 60 is tightened to engage segments 62, leg 48 is restrained against movement with respect to shaft 12 and is therefore held fixed relative thereto. Loosening screw 60 so that it loosely engages or completely disengages segments 62 allows leg 48 to be moved relative to shaft 12 whereby to allow tool 10 to be used with pipes of varying outer diameters.

Figure 2:
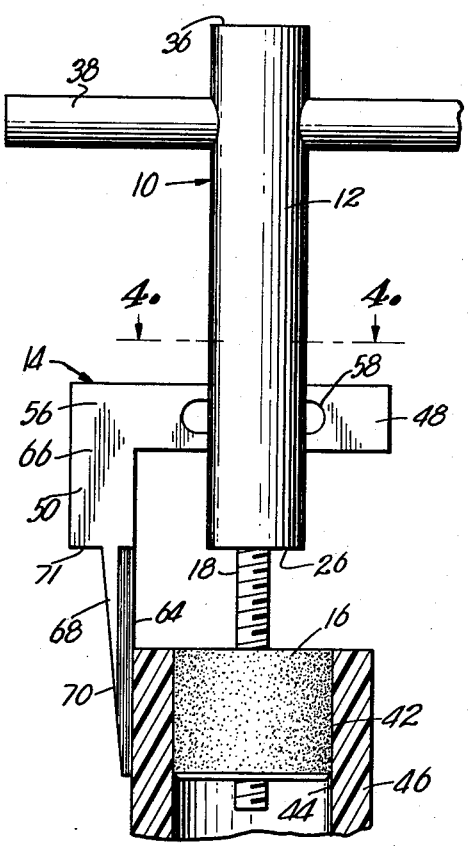
FIG. 2 is a rear elevational view partially in section thereof.

Second leg 50 of blade element 14 extends laterally from leg 48 and depends therefrom as best seen in FIGS. 1 and 2. Leg 50 is provided with an edge 64 which is adapted to engage the outer surface of pipe 46 so that the latter is scraped as edge 64 passes therearound. Edge 64 is honed so as to present a sharp blade sufficient to remove the outer film of material adjacent one end of pipe 46, the edge 64 uniformly engaging the outer surface of pipe 46 so that all foreign matter as well as a layer of plastic may be removed therefrom. The configuration of leg 50 is preferably that shown in FIGS. 1 and 2, wherein the upper portion 66 is of substantially the same width as leg 48, and lower portion 68 is of less width than portion 66 and has an edge 70 converging with edge 64. A shoulder 71 lies between portions 66 and 68 and is in substantially the same horizontal plane as end 26 of shaft 12. Lower portion 68 is considerably more resilient than upper portion 66 due to the decreased width whereby to allow scraping edge 64 to be brought into tight engagement with the outer surface of pipe 46 through the manipulation of leg 48 and screw 60.

To use the instant device to scrape the outer surface of a pipe such as 46 it is necessary that plug 16 have an outer diameter substantially equal to the inner diameter of the pipe to be scraped. It will of course be appreciated that plugs of varying sizes will be furnished with tool 10 whereby the same may be used with pipes of varying inside diameters and that such plugs will be similar in construction to plug 16 used for purposes of illustration herein. After threadably mounting plug 16 on rod 18, plug 16 is inserted within pipe 46. Leg 48 of blade element 14 is then shifted in groove 28 until edge 64 tightly engages the outer surface of pipe 46. Screw 60 is then tightened until the under side thereof tightly engages segments 62 of leg 48, blade element 14 thus being fixed relative to shaft 12 so that no movement of element 14 with respect to shaft 12 is possible. Tool 10 is then manually operated by grasping member 38 to thereby rotate shaft 12 about the longitudinal axis thereof, thus rotating blade element 14 and thereby edge 64 with respect to pipe 46. As edge 64 moves around pipe 46 it engages the outer surface thereof and removes the outer film of material thereon by a scraping action. As the rotation of shaft 12 continues through the means of handle 38, rod 18 is screwed further into plug 16 and edge 64 progressively engages and scrapes a greater portion of the outer surface of pipe 46. This scraping action continues until such time as end 26 of shaft 12 moves into engagement with the upper face of plug 16 and prevents further movement of blade edge 64 longitudinally of pipe 46.

When the scraping of the outer surface of pipe 46 has been accomplished as above described, the tool 10 and plug 16 may be removed from engagement with pipe 46 by exerting an outward pull upon handle 38.

As is apparent from the foregoing, applicant has provided a tool 10 which is simple and economical in construction and which may be manually operated by a single person to scrape the exterior surface of a length of plastic pipe adjacent the ends thereof without the necessity of rotating the length of pipe and which tool is adaptable for cleaning pipe of any diameter.

Having thus described the invention what is claimed as new and desired to be secured by Letters Patent is:

A pipe scraper comprising a shaft having a longitudinally extending, flattened portion and provided with a transverse groove in said portion intermediate the ends thereof; a threaded rod secured to said shaft at one end thereof and extending outwardly therefrom concentrically with the longitudinal axis of the shaft; a cylindrical plug of frictionable material adapted to be inserted within a pipe for frictionally engaging the inner surface of the latter and provided with a centrally disposed, internally threaded bore for threadably receiving the outer end of said rod to permit the latter to be advanced into and out of the plug and thereby said pipe as said shaft is rotated in opposed directions; an L-shaped blade element having a first leg and a second leg normal to said first leg at one extremity of the latter, said first leg having a longitudinally extending slot therein and being complementally received within said groove for transverse movement relative to said shaft, said second leg being provided with an elongated outermost portion having a length substantially greater than the transverse width thereof to present a resilient blade having an edge adapted to engage the outer surface of said pipe when said plug is inserted therewithin and yieldable relative to said first leg about the latter; and a screw on the shaft threadably mounted in said flattened portion and normally disposed within the slot of said first leg, said screw having a head for engaging said first leg on opposed sides of said slot for clamping said first leg against said flattened portion to thereby releasably and adjustably secure said blade element to said shaft when said edge engages the outer surface of the pipe in scraping relationship thereto, whereby the outer surface of the pipe is scraped by said edge as said shaft is rotated relative to the plug and about said axis.

References Cited in the file of this patent

UNITED STATES PATENTS

| | | |
|---|---|---|
| 1,500,045 | Bartlet | July 1, 1924 |
| 2,607,376 | Montgomery | Aug. 19, 1952 |

FOREIGN PATENTS

| | | |
|---|---|---|
| 603,913 | Great Britain | June 24, 1948 |
| 1,174,861 | France | Nov. 10, 1958 |
| 1,176,984 | France | Dec. 1, 1958 |